United States Patent
Valentini

(10) Patent No.: US 11,325,238 B2
(45) Date of Patent: May 10, 2022

(54) HAND GUIDED AND/OR HAND HELD ELECTRIC OR PNEUMATIC POWER TOOL

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 655 days.

(21) Appl. No.: 16/223,769

(22) Filed: Dec. 18, 2018

(65) Prior Publication Data

US 2019/0193255 A1   Jun. 27, 2019

(30) Foreign Application Priority Data

Dec. 21, 2017 (EP) .................................. 17209800

(51) Int. Cl.
| | |
|---|---|
| *H02K 7/14* | (2006.01) |
| *H02K 49/10* | (2006.01) |
| *B25F 5/00* | (2006.01) |
| *F16H 49/00* | (2006.01) |
| *H02K 7/11* | (2006.01) |

(52) U.S. Cl.
CPC ........... *B25F 5/001* (2013.01); *F16H 49/005* (2013.01); *H02K 49/102* (2013.01); *H02K 7/11* (2013.01); *H02K 7/145* (2013.01)

(58) Field of Classification Search
CPC .... H02K 49/102; H02K 49/104; H02K 7/145; H02K 7/14; H02K 49/106; H02K 49/108; H02K 49/10; B25F 5/001; B24B 23/04; B24B 47/12
USPC ............................................ 310/103, 50, 47
See application file for complete search history.

(56) References Cited

U.S. PATENT DOCUMENTS

| | | | |
|---|---|---|---|
| 2011/0037333 A1* | 2/2011 | Atallah | .................. H02K 51/00 310/98 |
| 2013/0002075 A1 | 1/2013 | Edwards et al. | |
| 2014/0015362 A1 | 1/2014 | Cheng | |

(Continued)

FOREIGN PATENT DOCUMENTS

| | | |
|---|---|---|
| EP | 1843454 A1 | 10/2007 |
| EP | 2745994 A2 | 6/2014 |
| WO | 9823025 A1 | 5/1998 |

(Continued)

OTHER PUBLICATIONS

WO-9823025-A1 (English Translation) (Year: 1998).*

(Continued)

*Primary Examiner* — Quyen P Leung
*Assistant Examiner* — Alexander Moraza
(74) *Attorney, Agent, or Firm* — Ware, Fressola, Maguire & Barber LLP

(57) ABSTRACT

The invention refers to a hand guided and/or hand held electric or pneumatic power tool (1, 1'), comprising an electric or pneumatic motor (15, 100), a working element (9) realizing a working movement (11), when the motor (15, 100) is activated, and at least one gear arrangement functionally located between the motor (15, 100) and the working element (9) for transmitting a rotational movement and torque from the motor (15, 100) to the working element (9) in order to realize the working movement (11). It is suggested that the at least one gear arrangement is embodied as a magnetic gear arrangement (20, 21, 41) using magnetic fields to transmit the rotational movement and torque from the motor (15, 100) to the working element (9) without mechanical contact, in order to realize the working movement (11).

16 Claims, 12 Drawing Sheets

(56) References Cited

U.S. PATENT DOCUMENTS

Figure 1:
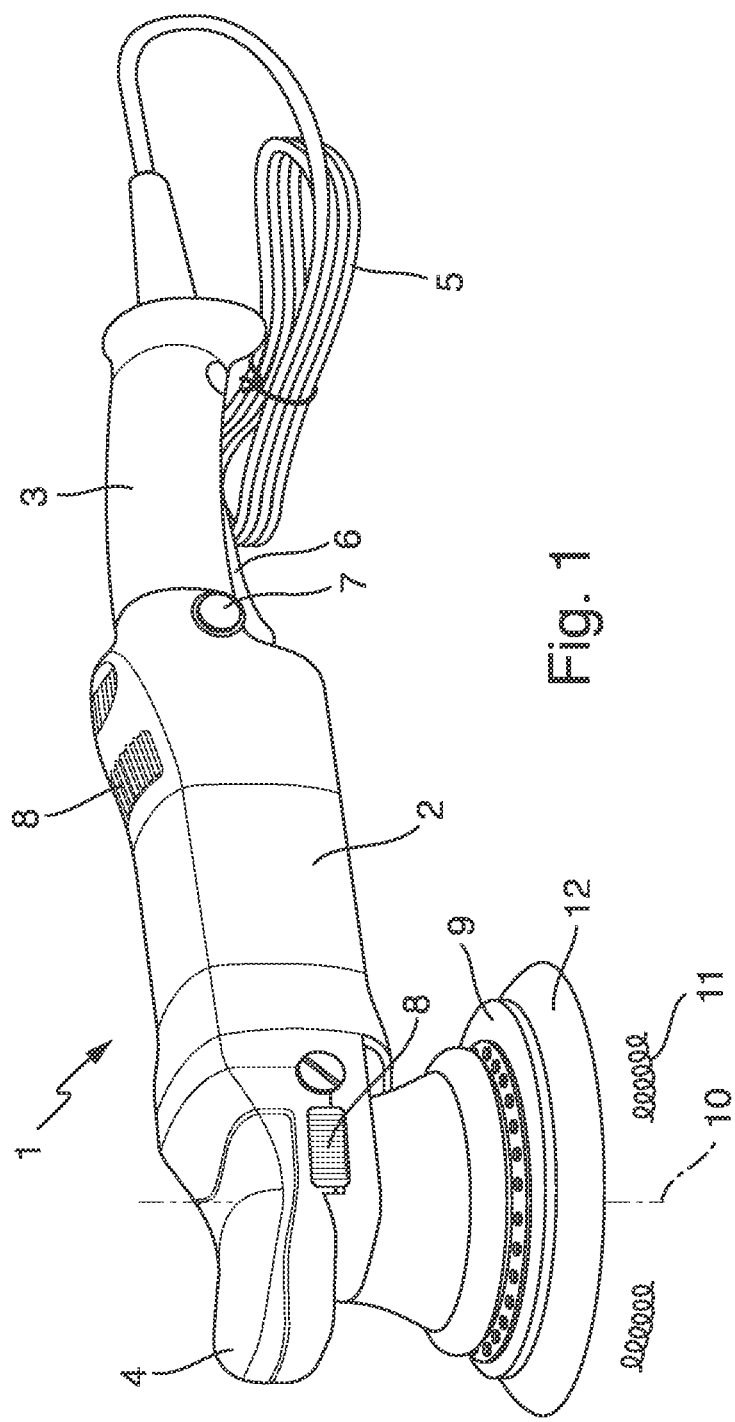

| | | | | |
|---|---|---|---|---|
| 2014/0034434 A1* | 2/2014 | Esenwein | ............... | B24B 55/00 |
| | | | | 188/267 |
| 2015/0018168 A1* | 1/2015 | Davey | ..................... | F16H 35/00 |
| | | | | 476/11 |

FOREIGN PATENT DOCUMENTS

| WO | WO-9823025 A1 * | 5/1998 | ........... H02K 49/102 |
|---|---|---|---|
| WO | 2012090711 A1 | 7/2012 | |
| WO | 2016036116 A1 | 3/2016 | |

OTHER PUBLICATIONS

English language Abstract of WO 98/23025A1.
English language Abstract of EP1845454A1.
English language Abstract of WO 2012/090711A1.
English language Abstract of EP2745994A2.
English language Abstract of WO 2016/036116A1.

\* cited by examiner

HAND GUIDED AND/OR HAND HELD ELECTRIC OR PNEUMATIC POWER TOOL

The present invention refers to a hand guided and/or hand held electric or pneumatic power tool, comprising an electric or pneumatic motor, a working element realizing a working movement, when the motor is activated, and at least one gear arrangement functionally located between the motor and the working element for transmitting a rotational movement and torque from the motor to the working element in order to realize the working movement.

The power tool may be, for example, a drill, a grinder (straight or angle grinder), a sander, a polisher, a glazing machine, a mixer, a screwdriver or the like, only to name a few. Accordingly, working element may be embodied as a drill chuck, a carrier element of a grinder or a backing pad of a sander or a polisher. The working element is embodied to receive and hold a tool accessory for performing a desired work which the power tool is adapted to perform. For instance, the drill chuck may be embodied in order to receive and hold a drill bit of various sizes. The carrier element may be embodied in order to receive and hold a grinding wheel. The backing pad may be embodied to receive and hold a sanding element (e.g. sanding paper, sanding fabric or the like) or a polishing pad (e.g. a foam pad, a wool pad or a microfiber pad).

The working movement performed by the working element and the tool accessory attached thereto is preferably of the rotational type. In particular, it may be a purely rotational movement, a gear driven roto-orbital movement or a random orbital movement. Furthermore, the working movement could also be a (non-rotational) purely orbital movement. With the purely rotational movement the working element rotates about a first rotational axis, which is congruent with a central axis of the working element running through the balance point of the working element. With the roto-orbital and the random-orbital movement the working element performs a first rotational movement about the first rotational axis spaced apart from a second rotational axis of the working element corresponding to the central axis running through the balance point of the working element. Additionally to the first rotational movement, the working element is also rotatable about the second rotational axis.

With the roto-orbital movement, the second rotational movement is forced by a gearing mechanism depending on the first rotational movement. For example, for a first rotational movement by 360° (one rotation) about the first rotational axis, the working element may perform a plurality of gear driven second rotational movements about the second rotational axis of approximately 30 to 120 rotations. With the random orbital movement, the working element is freely rotatable about the second rotational axis independently from its rotation about the first rotational axis.

For instance, a drill chuck and a grinder perform a purely rotational movement. A sander and a polisher may perform a purely rotational movement, a roto-orbital or a random orbital movement. An example for an electrically driven random orbital polisher is the BigFoot®-polisher LHR 21 ES produced and sold by RUPES S.p.A. from Vermezzo (IT). An example for a pneumatically driven random orbital polisher is the BigFoot®-polisher LHR 75 produced and sold by RUPES® S.p.A. from Vermezzo (IT). An example for a pneumatically driven random orbital sander is the Skorpio®-sander produced and sold by RUPES® S.p.A. from Vermezzo (IT).

In the power tools known in the art mechanical gear arrangements are commonly used. The gear arrangements can reduce a first rotational speed of an input shaft (e.g. a motor shaft) into a second rotational speed of an output shaft (e.g. a rotational shaft of the working element), the second speed being smaller than the first speed, thereby generating a larger torque at the output shaft. Furthermore, bevel gear arrangements are used in the known power tools in order to translate a rotational speed and a torque from an input shaft to an output shaft, wherein the rotational axes of the two shafts run in an angle $\alpha$ in respect to one another, wherein the angle may be $180°>\alpha\geq90°$, in order to realize an angular power tool. Finally, as already described above, mechanical gears are used in known roto-orbital power tools for forcing the working element to realize the roto-orbital rotational movement.

Furthermore, from completely different technical fields it is known to use magnetic gear arrangements for transmitting rotational movement and torque between electrical machines (motors or generators) and a load (see for example U.S. Pat. No. 3,378,710). It is well known to use such magnetic gear arrangements in very large appliances, such as conveyer belts, ship propulsions, power generators, wind turbines, large pumps and the like, or in the technical field of aerospace applications, manufacturing of pharmaceuticals or food and other environments with a high hygienic standard. In the known magnetic gear arrangements the magnetic flux is transmitted only in a radial direction.

It is an object of the present invention to improve the known hand guided and/or hand held power tools, in particular in terms of wear, noise emission, weight, size, vibrations and maintenance requirements.

In order to find a solution to this problem a power tool comprising the features of claim 1 is suggested. In particular, it is suggested that the at least one gear arrangement of the power tool is embodied as a magnetic gear arrangement using magnetic fields to transmit the rotational movement and torque from the motor to the working element without mechanical contact, in order to realize the movement of the working element. The working movement is preferably of the rotational or roto-orbital or orbital type.

The power tool according to the invention has the advantage that the power transmission is effected without contact, thereby avoiding noise created by grinding parts of a mechanical gear arrangement. Further, by means of the magnetic gear arrangement an overload protection can be easily realized in the sense that the driving and driven parts of the gear arrangement will simply slip through in case an excessive amount of force is applied to the working element of the power tool during its intended use, thereby avoiding damage to the tool and the surface to be worked. The amount of force which has to be exceed for letting the driving and driven parts of the gear arrangement slip can be specified by providing for a certain force of magnetic fields within the gear arrangement and/or by providing for a certain distance or air gap between magnets creating these fields and/or by introducing certain materials in the air gap. Another advantage is that no lubrication or maintenance of the gear arrangement is required. Furthermore, magnetic gear arrangements have a constant performance over time, which is not the case with mechanical gear arrangements, which are susceptible to wear and reduced performance over time. It is further advantageous that due to the fact that the driving and the driven parts of the gear arrangement are not in contact with one another any vibrations caused by the rotating working element during the intended use of the power tool are extenuated thereby providing for an even and smooth operation of the power tool.

According to a preferred embodiment of the invention, the at least one magnetic gear arrangement comprises a magnetic bevel gear arrangement for transmitting the rotational speed of an input shaft (e.g. a motor shaft) into a rotational speed of an output shaft (e.g. a rotational shaft of the working element), wherein the rotational axes of the two shafts run at an angle $\alpha$, $180°>\alpha\geq 90°$. In this way an angular power tool may be realized, wherein the rotational shaft of the working element runs at an angle $\alpha$ in respect to the motor shaft ranging $180°>\alpha\geq 90°$. The bevel may have a gear ratio of 1:1 thereby simply transmitting the rotational speed of the input shaft into the same rotational speed of the output shaft. Alternatively, the bevel gear arrangement may have a certain gear ratio $\neq 1$ thereby changing a given rotational speed of the input shaft into a different rotational speed of the output shaft. In power tools usually the higher speed of the motor shaft is reduced to a lower speed of the rotational shaft of the working element. The gear ratio may be up to 30:1 (30 rotations of the motor shaft correspond to one rotation of the rotational shaft of the working element). By reducing the rotational speed of the output shaft the torque available at the output shaft is increased. Preferably, the gear ration is around 2:1 (12.000 rpm of the motor shaft are transformed into 6.000 rpm of the gear's output shaft) up to 20:1 (20.000 rpm of the motor shaft are transformed into 1.000 rpm of the gear's output shaft). Alternatively or additionally to the magnetic bevel gear arrangement, the at least one magnetic gear arrangement of the power tool may comprise a coaxial magnetic gear arrangement with an input shaft running coaxially to an output shaft, coaxial magnetic gear arrangement preferably located between the motor and the bevel gear arrangement. The coaxial magnetic gear arrangement will be described in more detail below.

The inventors have individualized the mechanical gear arrangement of known hand guided and/or hand held power tools as a main source for noise emission, weight, size and maintenance requirements. All hand guided and/or hand held power tools known in the art so far use mechanical gear arrangements with meshing teeth of gearwheels in order to transmit the rotational movement and torque from the rotating motor shaft into the movement of the working element. These mechanical gear arrangements have the disadvantage of mechanical wear, noise emission, need for lubrication and cooling, relatively large dimensions and relatively high weight. All these drawbacks can be overcome by the power tool according to the present invention. By using only contactless magnetic gear arrangements in a power tool a giant leap in the design and usability of hand guided and/or hand held power tools has been achieved. The power tool according to the present invention provides for a significant advantage in terms of durability, low-maintenance, noise and vibration reduction.

An important characteristic of the power tool according to the present invention is that it uses the magnet fields of powerful permanent magnets for torque transmission between the motor and the tool shaft or the working element, respectively. The magnetic gear arrangement has no wearing parts and, therefore, does not require oil or grease lubrication, resulting in high reliability, and little or no maintenance. It is also more efficient than a mechanical gear arrangement as there is no friction from contacting driving and driven parts. Furthermore, magnetic gear arrangements also protect against overloads by slipping harmlessly if an excessive torque is applied, and automatically and safely re-engaging when the excess torque is removed. This prevents damage of the motor of the power tool and protects users of the tool from accidents and injury due to the tool breaking away in case of applying too much force to the tool by the user.

Preferably, a concentric magnetic gear arrangement comprises at least three elements, two of which have powerful permanent magnets arranged in an alternating north-south pattern and generating different magnetic field patterns. The third element consists of ferromagnetic steel segments which alter the magnetic field patterns between the other two permanent magnet elements, thereby working as a modulator of the magnetic fields. The first element consists of a low number of magnets and is connected to the high speed input motor shaft in a torque proof manner, in case the gear arrangement is to realize a speed reduction. The modulator consists of a number of ferromagnetic steel segments held within a non-magnetic mechanical structure and is typically connected to a low speed shaft in connection with a tool shaft which is directly or indirectly connected to the working element. The third element comprises a high number of permanent magnets. If however, the gear arrangement is to realize a speed increase, the higher number of magnets would be mounted to the first element (connected to the motor shaft) and the low number of magnets would be mounted to the third element (connected to the tool shaft). Usually the third element is held stationary while the other two elements rotate at different speeds in the same direction. Alternatively, the modulator can be held still and the two permanent magnet elements rotate at different speeds in opposite directions. The role of the ferromagnetic segments of the modulator element is to modulate the magnetic fields created by the first and third elements such that they interact in a magnetically geared manner. Consequently, torque can be transmitted between any two of the three components in a geared manner, or between all three of them in a manner similar to an epicyclic mechanical gear arrangement.

There is no physical contact between any of the elements as the motion is transferred across an air gap using the force of the magnetic field. This air gap allows the gear to work without lubrication and provides for a quiet and smooth operation. The magnetic gear arrangement is capable of transmitting high rotational force or torque.

There are many possibilities to use magnetic gear arrangements in a power tool. A first gear arrangement could be provided immediately after the motor shaft for reducing the rotational speed and enhancing the torque of the power tool. Preferably, such a magnetic gear arrangement has coaxial input and output shafts. For example, the motor shaft could rotate at a maximum rotational speed of 20.000 rpm, the magnetic gear arrangement could have a gear ratio of 2:1 reducing the rotational speed at the output shaft of the gear arrangement to 10.000 rpm.

There are several magnetic gear arrangements, which can be used in a power tool. A first type of magnetic gear arrangement is embodied and works as follows: It consists of at least three concentric rings. The inner permanent magnet ring usually consists of a low number of pole pairs and rotates at a high speed generating a magnetic field. The inner ring usually is connected to the motor shaft or any other intermediate shaft rotating at a relatively high speed. The intermediate modulator ring has a number of ferromagnetic steel segments supported by a non-magnetic and non-conductive structure. The intermediate ring alters and transfers the magnetic field generated by the inner magnet ring to an outer permanent magnet ring. The outer ring consists of a high number of pole pairs and is usually connected to the tool shaft or any other intermediate shaft in direct or indirect connection with the tool shaft. The number of pole pairs of the two permanent magnet rings determines the number of ferromagnetic segments of the modulator and the gear ratio. According to this embodiment, the modulator is positioned between the inner and the outer magnet rings.

With this type of magnetic gear arrangement the outer ring is held still and, by the rotation of the inner ring connected in a torque proof manner to the motor shaft, the modulator ring, connected in a torque proof manner to the tool shaft, will rotate at a lower speed in the same direction of the inner ring. Alternatively, the modulator could be held still and the outer ring, connected to the tool shaft, would rotate at a lower speed in the opposite direction of the rotation of the inner ring. The main characteristics and advantages of such a gear arrangement are:

high torque density
high gear ratio
compact height

The second type of magnetic gear arrangement is embodied and works as follows: The two permanent magnet elements having a different number of magnetic pole pairs preferably have a cylindrical shape and coaxial axes of rotation. These two elements can freely rotate in respect to one another. A first permanent magnet element is connected in a torque proof manner to the motor shaft, while the second permanent magnet element is connected in a torque proof manner to the tool shaft. The modulator also has a cylindrical shape, wherein the cylinder axis is preferably located coaxial to the axes of rotation of the two other elements. The modulator has ferromagnetic steel segments and is designed as a stationary external cage surrounding the two permanent magnet elements. The modulator alters the magnetic field pattern generated by the first permanent magnet element and its rotation and transfers the altered magnetic field pattern to the second permanent magnet element provoking it to rotate in the same direction but at a different speed than the first magnet element. The number of the pole pairs of the two permanent magnet elements determines the number of the ferromagnetic segments of the modulator and the gear ratio of the gear arrangement. The characteristic of such a gear arrangement are:

high torque density
low gear ratio
large height
low mechanical complexity
compact diameter A third type, a so-called disk type concentric magnetic gear arrangement is embodied and works as follows: The two permanent magnet elements having a different number of magnetic pole pairs are shaped disk-like and rotation about rotational axes running coaxial to one another. The permanent magnets of the two elements face each other and are separated by an air gap in a plane running perpendicular to the axes of rotation. A first permanent magnet element is connected in a torque proof manner to the motor shaft, while the second permanent magnet element is connected in a torque proof manner to the tool shaft. The modulator, consisting of ferromagnetic steel segments is designed as a stationary disk located in the air gap between the two permanent magnet disks. The modulator alters and transfers to the second permanent magnet element the magnetic field pattern generated by the rotating first permanent magnet element. The number of the pole pairs of the two permanent magnet elements determines the number of the ferromagnetic segments of the modulator and the gear ratio of the gear arrangement. The characteristic of such a gear arrangement are:

low torque density
high gear ratio
compact height
low mechanical complexity
compact diameter
easy to axially separate the first element from the second element The first number ($n\_input$) of first magnetic pole pairs of the first component and the second number ($n\_output$) of second magnetic pole pairs of the second component are preferably even numbers. The gear ratio (i) of the magnetic gear arrangement is $i=n\_output/n\_input$. The number ($n\_pp$) of ferromagnetic pole pieces is either $n\_pp=(n\_output-n\_input)$ or $n\_pp=(n\_output+n\_input)$.

According to a preferred embodiment of the invention the magnetic gear arrangement is at least partially integrated in the electric or pneumatic motor of the power tool. With this evolution of the magnetic gear arrangement, a stator is introduced with electrical windings around the gear arrangement. This generates a very compact electric motor that is particularly powerful. The resulting electrical machine is particularly well suited for applications in connection with a hand guided and/or hand held power tool, where a high speed electric motor is traditionally used with a mechanical gear arrangement for reducing the rotational speed and enhancing the torque.

The integrated electric motor and magnetic gear arrangement may be embodied and may work as follows: With the outer magnet ring and the steel segment ring being removed, the inner magnet ring is left within a set of windings housed in the stator. This would be identical to a conventional permanent magnet motor but with a large air gap between the magnets and the stator. As an electric current flows in the windings, the inner magnet ring will rotate. If the steel segment rotor is introduced into the air gap between the inner magnet ring and the stator windings, this has no adverse effect in the operation of the motor. By fixing the outer magnet ring to the stator, the steel segment ring rotates at a slower speed than the inner magnet ring. Just like the magnetic gear arrangement the steel segment ring drives the output or tool shaft connected to the working element. This combined electric motor and magnetic gear arrangement has all the benefits of a magnetic gear like high efficiency, low maintenance, high reliability and attenuation of vibrations. The result is a very compact high torque machine very well suited for use in any type of electric power tool having a rotating working element.

With the magnetic gear arrangement being at least partially integrated in the electric motor of the tool, preferably, the outer component of the gear arrangement is provided with a set of windings to become part of an electric motor and the first and second magnetic fields are generated by permanent magnets on the inner and outer components. This arrangement combines the functionality of a magnetic gear arrangement and a typical electrical machine by allowing for geared torque transmission in combination with operation in either motoring or generating modes. When the windings of the outer component are supplied with a three phase, 120 degree displaced current, a rotating magnetic field is set up in the motor. This rotating magnetic field has the same number of pole pairs as the first magnetic field generated by the inner component. The rotating magnetic field and the first magnetic field directly couple such that the harmonic of the first magnetic field can be used for electromechanical energy conversion, i.e. for converting electrical energy into mechanical energy for rotating the tool shaft.

The magnetic gear arrangement can be at least partially integrated with the electric motor in several other ways as well:

In an electric motor designed with permanent magnets (e.g. brushless motor), by having the same permanent magnets adapted to work simultaneously as a functional part of the motor and as the first magnetic element of the magnetic gear arrangement, in order to transfer the magnetic field of the motor-rotor to another permanent magnetic element of the gear arrangement and further to the output shaft.

By replacing one or more of the permanent magnet elements of the magnetic gear arrangement with a motor-rotor or motor-stator having electrical windings.

By having a motor shaft integrated with one of the two permanent magnet elements of the magnetic gear arrangement. In this way the permanent magnets could be directly attached to a part of the motor shaft, which part would then act as one of the permanent magnet elements of the magnetic gear arrangement.

Of course, the magnetic gear arrangement could just as well be at least partly integrated in a pneumatic motor of the power tool. This could be achieved, for example, by having the cylindrical housing of the pneumatic motor form an integral part with the magnetic gear arrangement stator, having the motor shaft form an integral part with one of the rotating permanent magnet elements of the gear arrangement, or having the rotor of the pneumatic motor form an integral part one of the permanent magnet elements of the gear arrangement.

Figure 2:
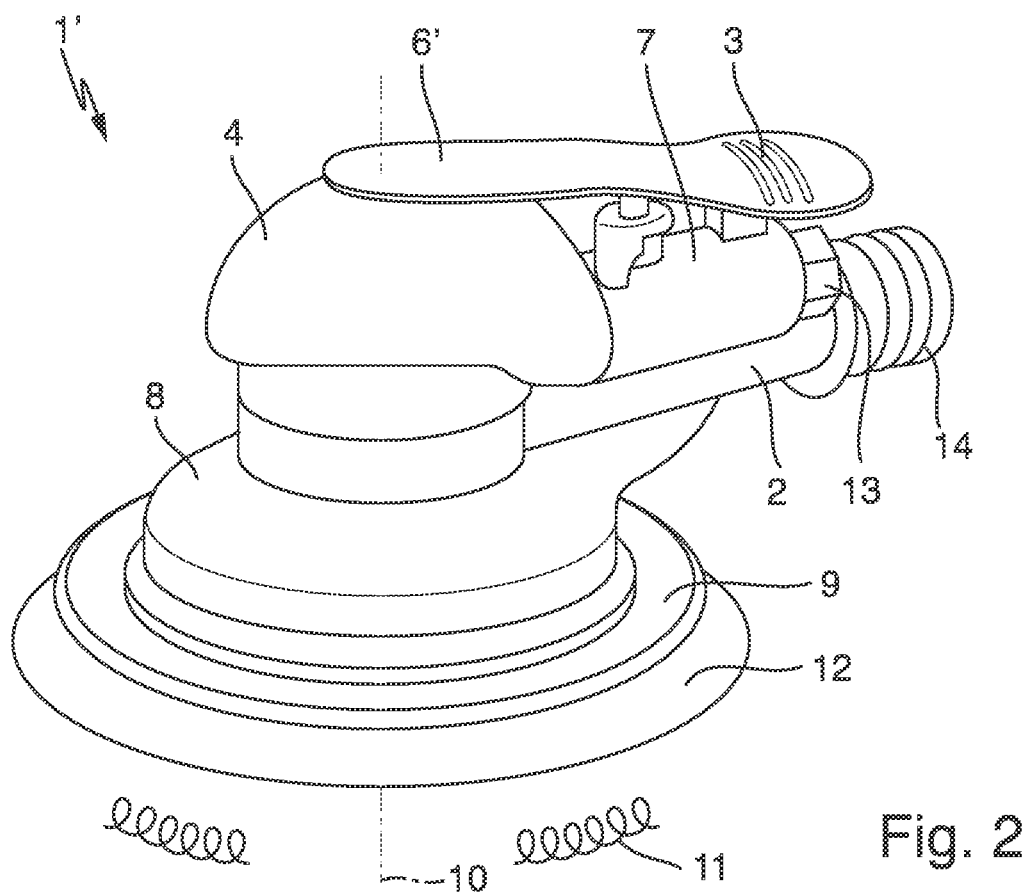
Figure 3:
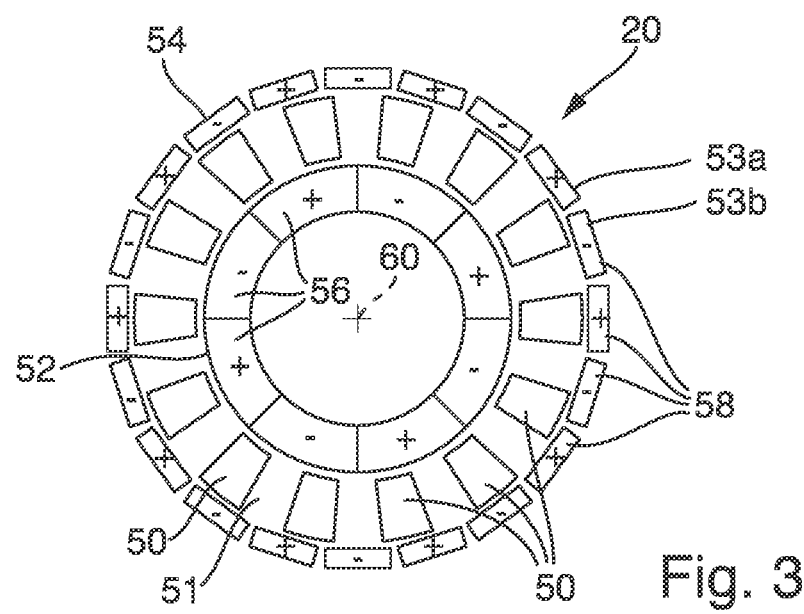
Figure 4:
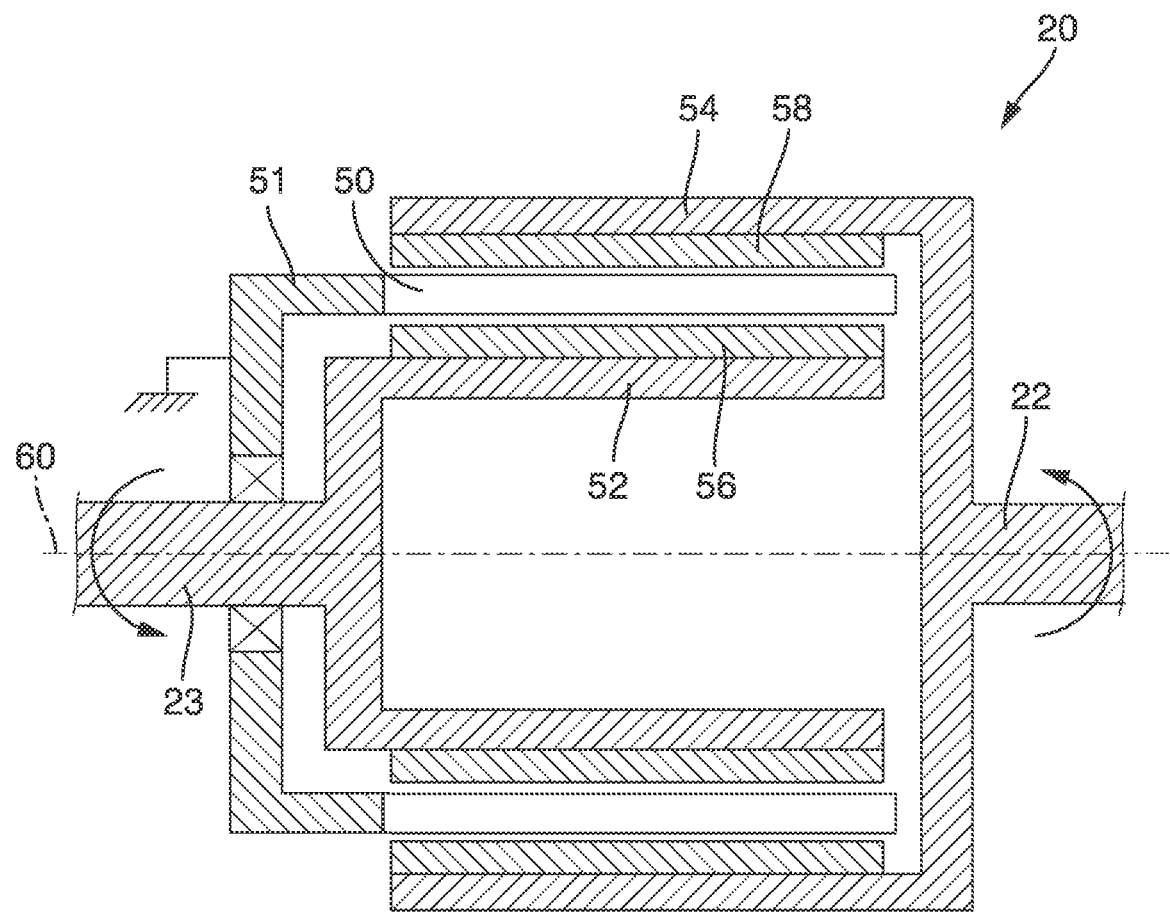
Figure 5:
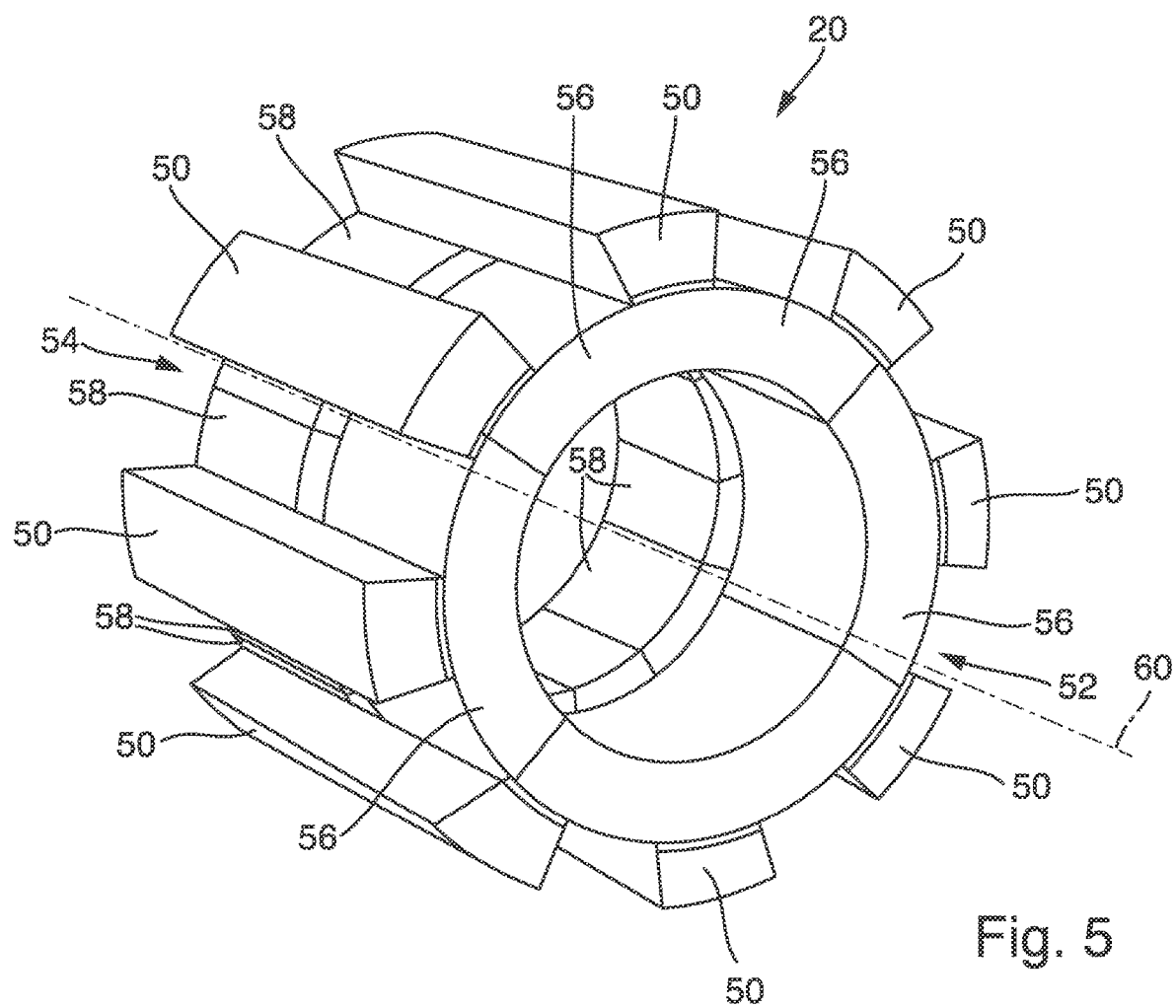
Figure 6:
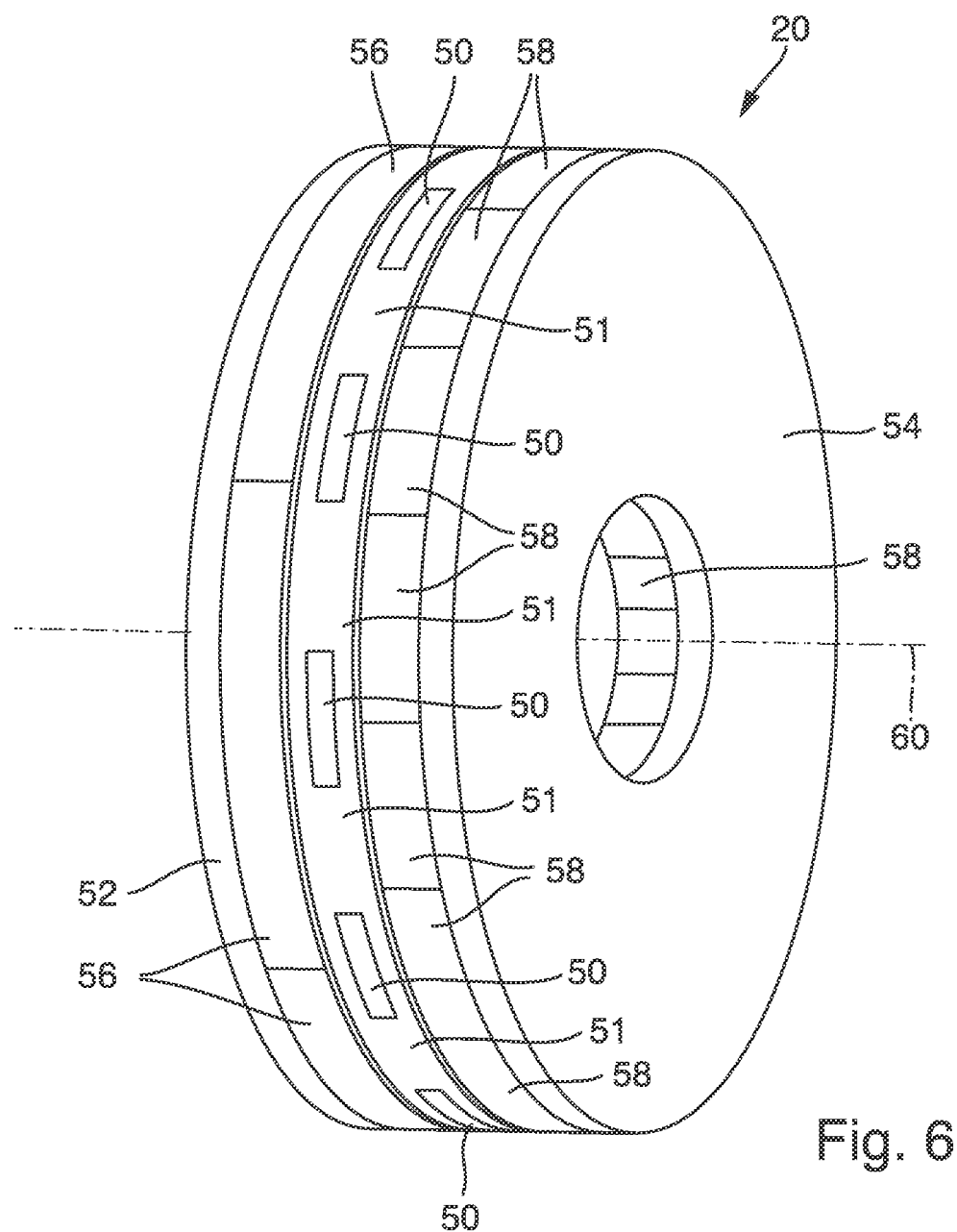
Figure 7:
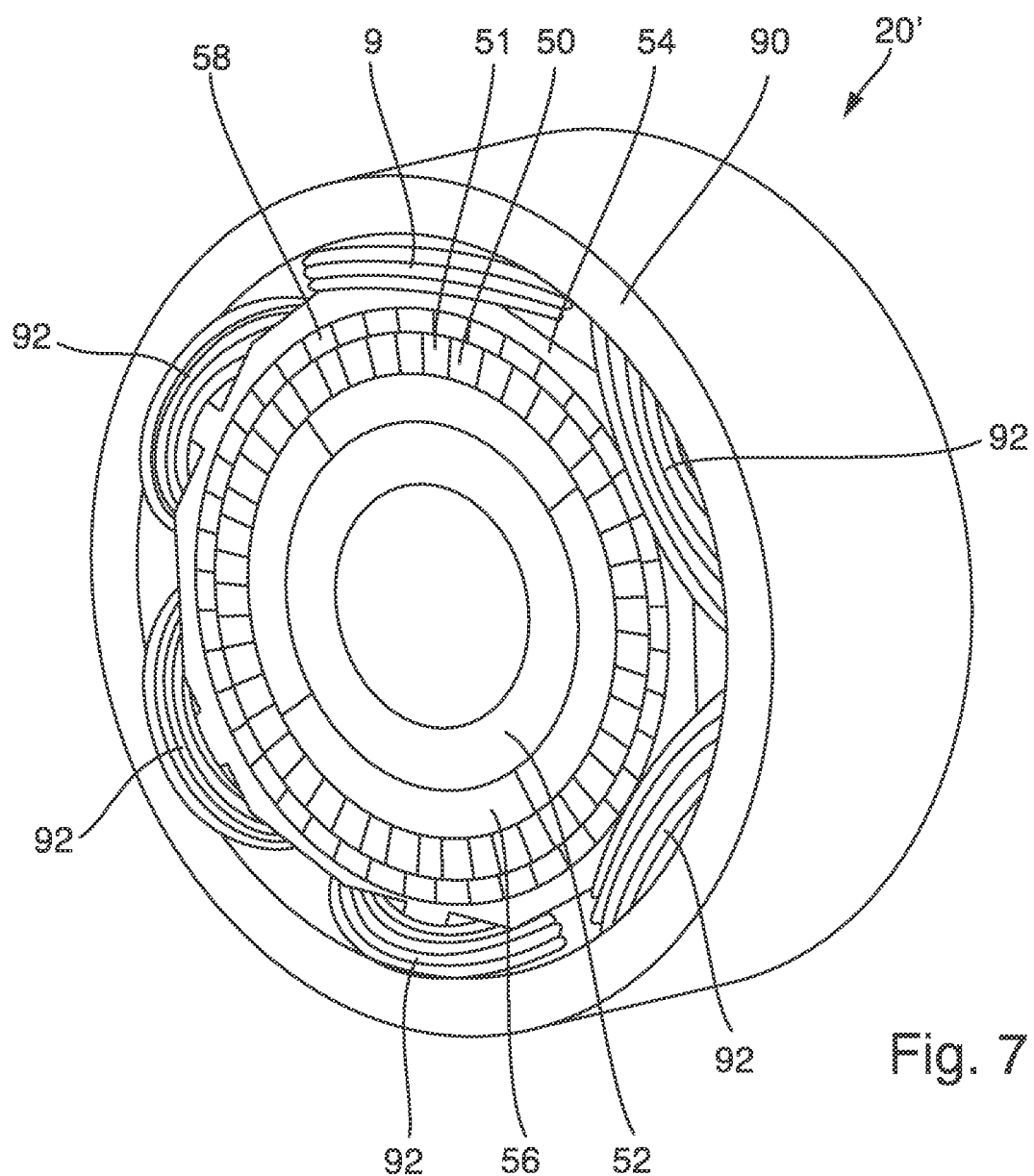
Figure 8:
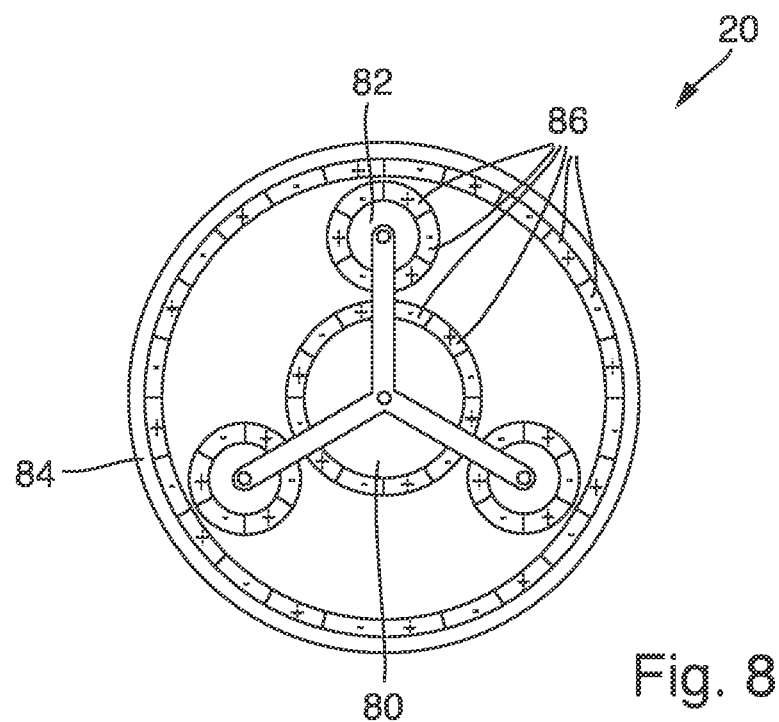
Figure 9:
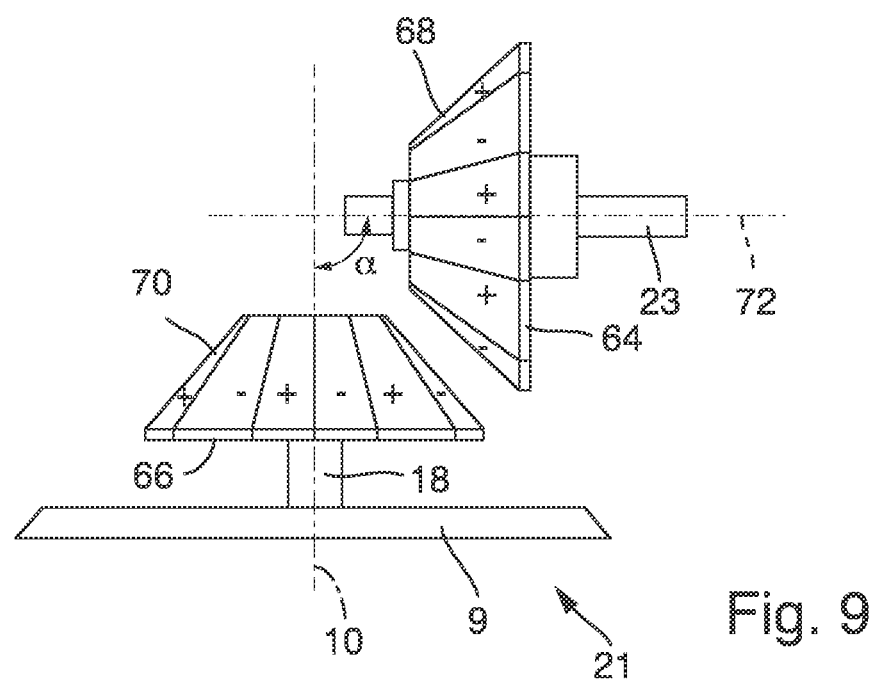
Figure 10:
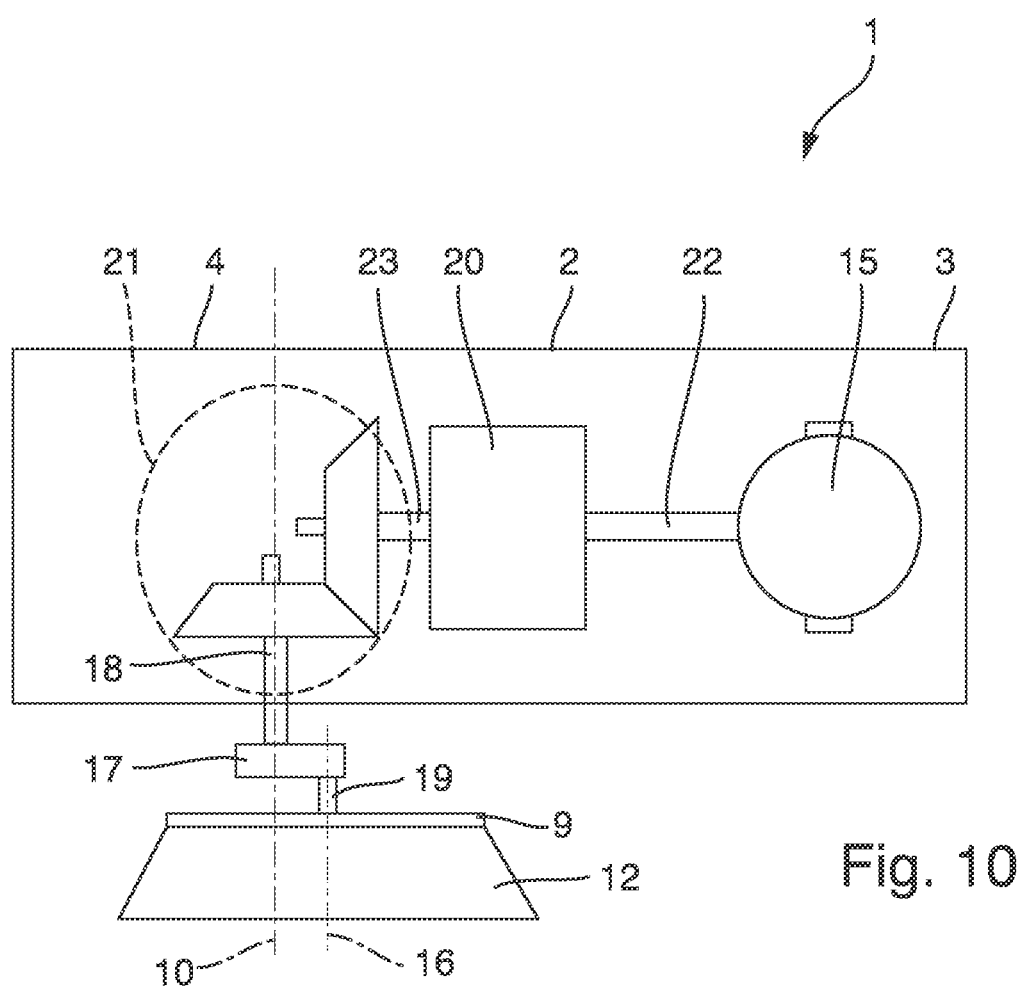
Figure 11:
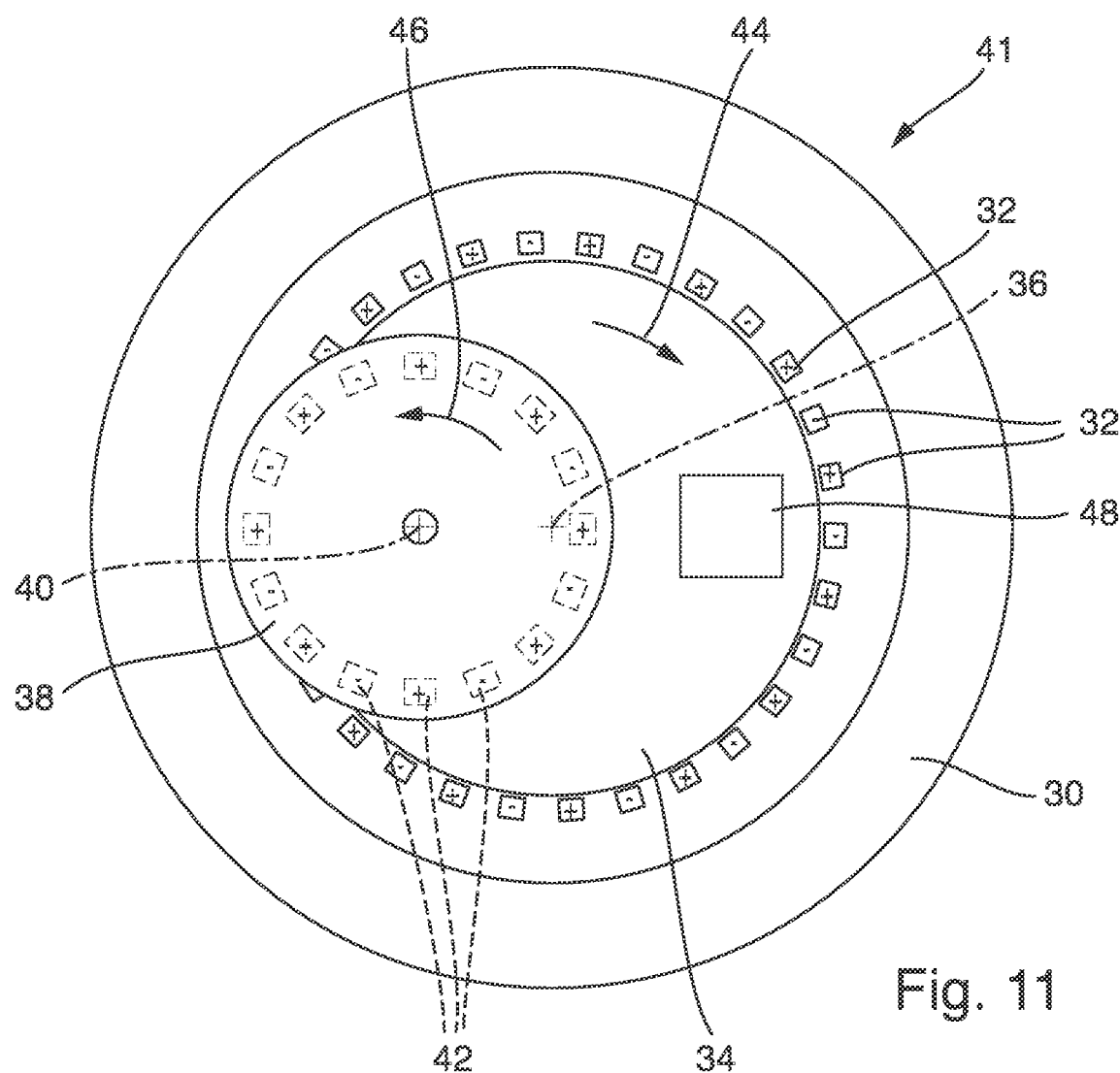
Figure 12:
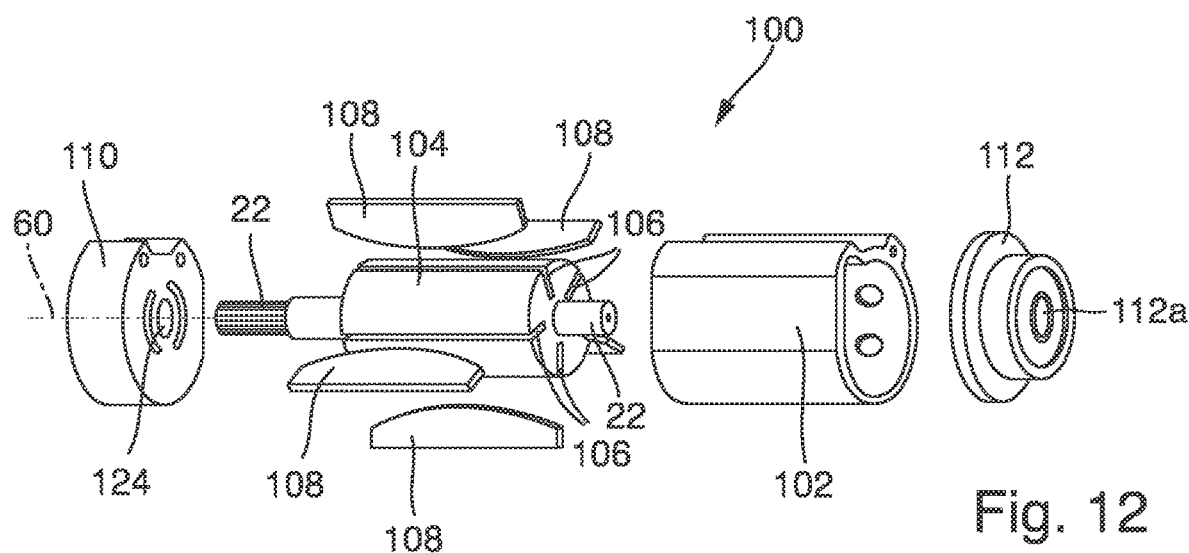
Figure 13:
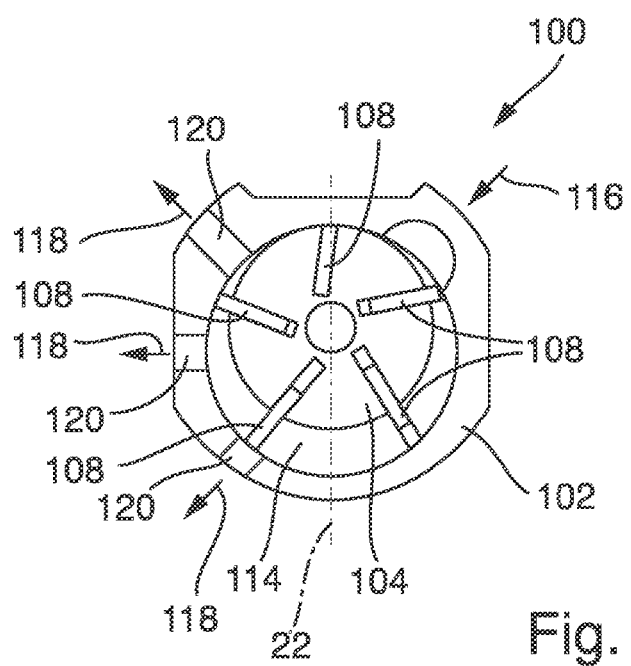
Figure 14A:
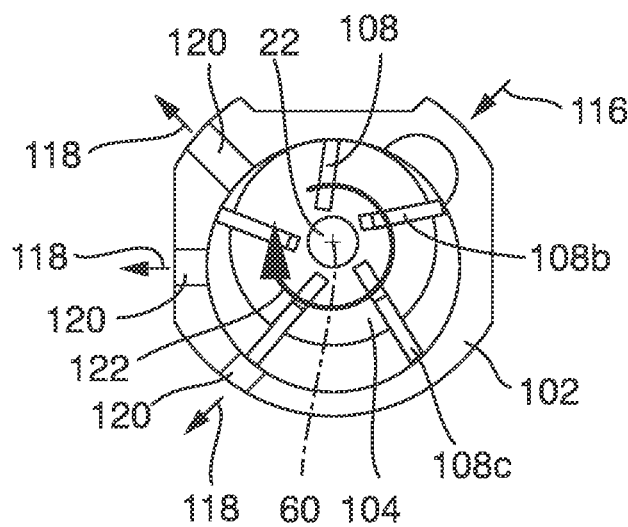
Figure 14B:
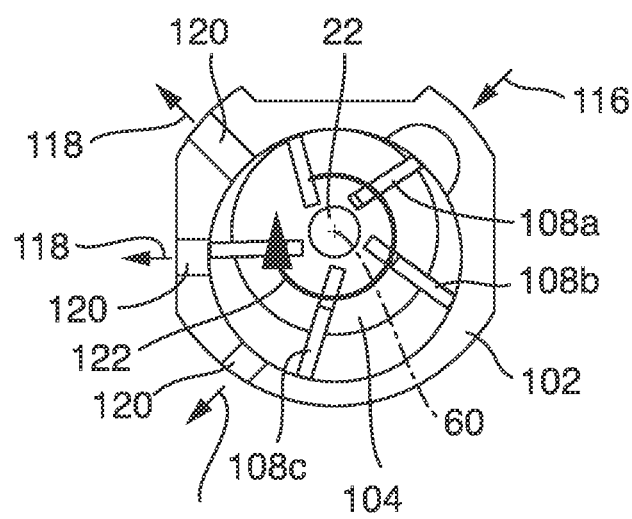
Figure 14C:
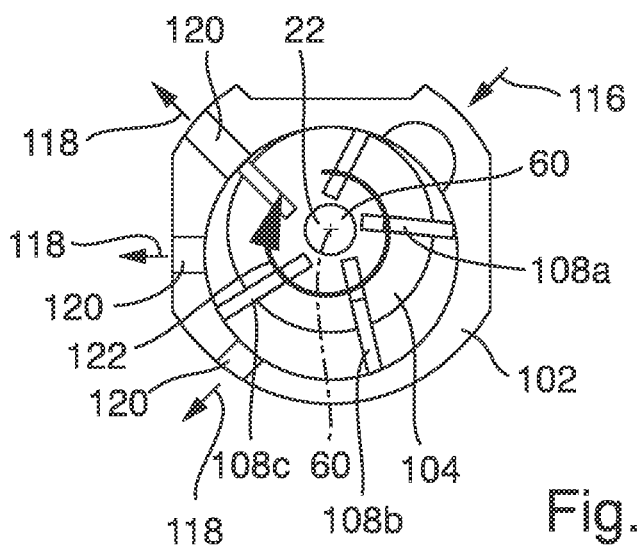
Figure 15:
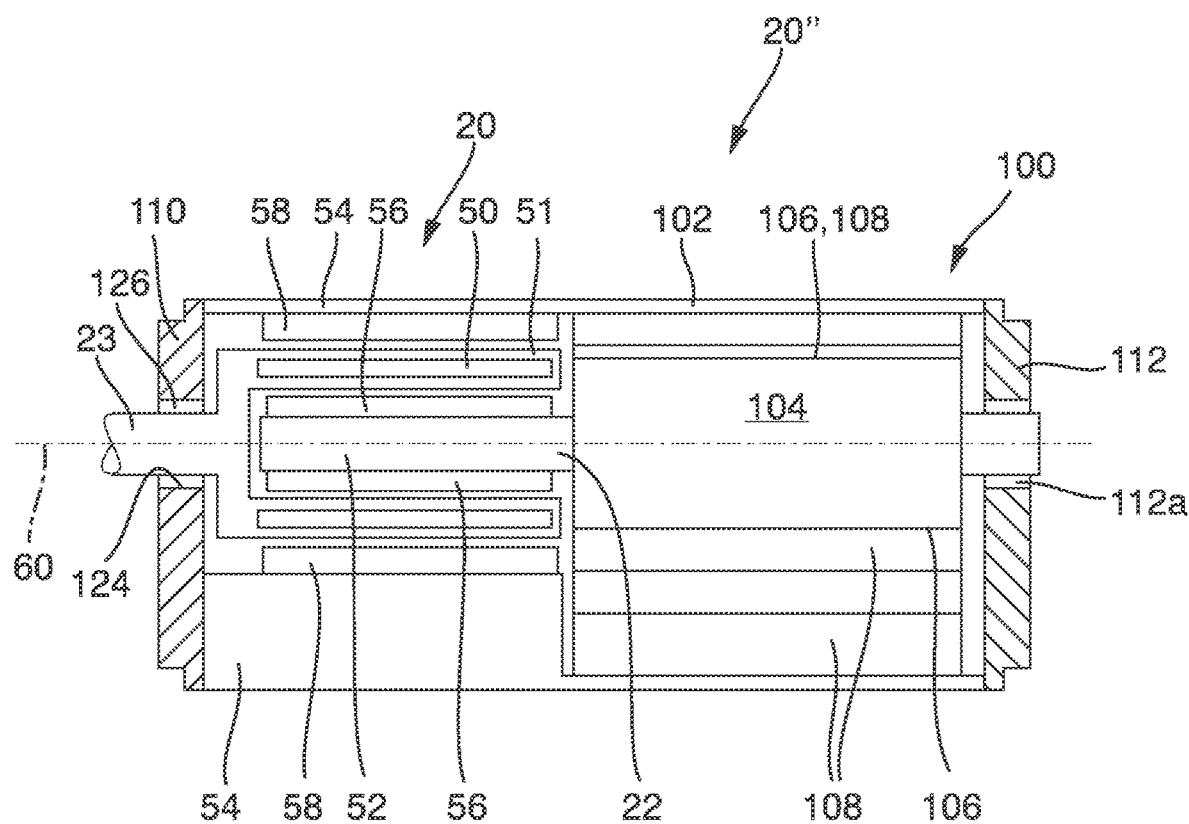

Further features and advantages of the present invention will become apparent from the following detailed description making reference to the accompanying drawings. These show:

FIG. 1 an embodiment of a hand held and hand guided electric power tool according to the present invention;

FIG. 2 an embodiment of a hand held and hand guided pneumatic power tool according to the present invention;

FIG. 3 a schematic cross sectional view of a magnetic gear arrangement of a hand held and hand guided power tool according to the present invention;

FIG. 4 a schematic longitudinal sectional view of a magnetic gear arrangement of a hand held and hand guided power tool of FIG. 3;

FIG. 5 a further embodiment of a magnetic gear arrangement for use in a power tool;

FIG. 6 yet another embodiment of a magnetic gear arrangement for use in a power tool;

FIG. 7 a perspective schematic view of another gear arrangement of a hand held and hand guided electric power tool according to the present invention, with at least part of a tool's motor integrated in the magnetic gear arrangement;

FIG. 8 a schematic cross sectional view of another magnetic gear arrangement of a hand held and hand guided power tool according to the present invention;

FIG. 9 a schematic cross sectional view of yet another magnetic gear arrangement of a hand held and hand guided power tool according to the present invention;

FIG. 10 a schematic longitudinal sectional view of the power tool of FIG. 1;

FIG. 11 an example for yet another magnetic gear arrangement of a hand held and hand guided power tool according to the present invention;

FIG. 12 an exploded view of an example of a pneumatic motor of a hand held and hand guided power tool according to the present invention;

FIG. 13 a cross sectional view through the pneumatic motor of FIG. 12;

FIG. 14 various operating states A, B, C of the pneumatic motor of FIGS. 12 and 13 in a cross sectional view; and FIG. 15 a longitudinal sectional view through a combined pneumatic motor and magnetic gear arrangement of a hand held and hand guided power tool according to the present invention.

FIG. 1 shows an example of a hand held and hand guided electric power tool 1 according to the present invention in a perspective view. FIG. 10 shows a schematic longitudinal section through the power tool 1 of FIG. 1. The power tool 1 is embodied as a random orbital polishing machine (or polisher). The polisher 1 has a housing 2, essentially made of a plastic material. The housing 2 is provided with a handle 3 at its rear end and a grip 4 at its front end in order to allow a user of the tool 1 to hold the tool 1 and apply a certain amount of pressure on the top of the front end of the housing 2 during the intended use of the tool 1. An electric power supply line 5 with an electric plug at its distal end exits the housing 2 at the rear end of the handle 3. At the bottom side of the handle 3 a switch 6 is provided for activating and deactivating the power tool 1. The switch 6 can be continuously held in its activated position by means of a push button 7. The power tool 1 can be provided with adjustment means (not shown) for setting the rotational speed of the tool's electric motor 15 (see FIG. 10) located inside the housing 2. The housing 2 can be provided with cooling openings 8 for allowing heat from electronic components and/or the electric motor 15 both located inside the housing 2 to dissipate into the environment and/or for allowing cooling air from the environment to enter into the housing 2.

The power tool 1 shown in FIG. 1 has an electric motor 15. The electric motor 15 is preferably of the brushless DC (BLDC) type. Instead of the connection of the power tool 1 to a mains power supply by means of the electric cable 5, the tool 1 could additionally or alternatively be equipped with a rechargeable or exchangeable battery (not shown) located at least partially inside the housing 2. In that case the electric energy for driving the electric motor 15 and the other electronic components of the tool 1 would be provided by the battery. If the electric cable 5 was still present, the battery could be charged with an electric current from the mains power supply during or after operation of the electric motor 15. This would allow the use of an electric motor 15 which is not operated at the mains power supply voltage (230V in Europe or 110V in the US and other countries), but rather at a reduced voltage of, for example, 12V, 24V, 36V or 42V.

The power tool 1 has a disk-like working element 9 (or backing pad) rotatable about a rotational axis 10. In particular the working element 9 of the tool 1 shown in FIG. 1 performs a random orbital rotational movement 11. With the random orbital movement 11 the working element 9 performs a first rotational movement about a first rotational axis corresponding to rotational axis 10. Spaced apart from the first rotational axis 10 another second axis 16 (see FIG. 10) is defined about which the working element 9 is freely rotatable independently from the rotation of the working element 9 about the first rotational axis 10. The second axis 16 runs through the balance point of the working element 9 and parallel to the rotational axis 10. The random orbital movement 11 is realized by means of an eccentric element 17 attached to a tool shaft 18 in a torque proof manner and in which a rotational shaft 19 of the working element 9 is held and guided freely rotatable about axis 16.

The working element 9 is made of a semi-rigid material, preferably a plastic material, which on the one hand is rigid enough to carry and support a tool accessory 12 during the intended use of the power tool 1 and to apply a force to the working element 9 and the tool accessory 12 in a direction downwards and essentially parallel to the working element's rotational axis 10 and which on the other hand is flexible enough to avoid damage or scratching of a surface to be worked by the working element 9 or the tool accessory 12, respectively. For example in the case the tool 1 was a polisher, the tool accessory 12 may be a polishing material comprising but not limited to a foam or sponge, a microfiber, and real or synthetic lambs' wool. In FIG. 1 the tool accessory 12 is embodied as a sponge or foam pad.

The bottom surface of the working element 9 is provided with means for releasably attaching the tool accessory 12 for performing a desired work which the power tool 1 is adapted to perform. The attachment means for attaching the tool accessory 12 to the bottom surface of the working element 9 can comprise a first layer of a hook-and-loop fastener (or Velcro®) on the bottom surface of the working element 9, wherein the top surface of the tool accessory 12 is provided with the corresponding second layer of the hook-and-loop fastener. The two layers of the hook-and-loop fastener interact with one another in order to releasably but safely fix the tool accessory 12 to the bottom surface of the working element 9. Of course, with other types of power tools 1, the working element 9 and the tool accessory 12 may be embodied differently. The power tool 1 according to the present invention can be any type of power tool provided with a working element 9 performing some kind of working movement (purely rotational, roto-orbital (gear driven), random orbital or purely orbital).

Furthermore, the power tool 1 according to the invention comprises at least one magnetic gear arrangement functionally located between the electric motor 15 and the working element 9 or the tool shaft 18, respectively. In the embodiment shown in FIG. 10 two magnetic gear arrangements are provided, one being a coaxial magnetic gear arrangement 20 and the other being a magnetic bevel gear arrangement 21. The bevel gear arrangement 21 is provided because the power tool 1 is of an angular type, where a motor shaft 22 runs in a certain angle (preferably between 90° and below 180°) in respect to a tool shaft 18. In the shown embodiment the angle is exactly 90°.

The coaxial gear arrangement 20 is adapted for transmitting a rotational movement of the motor shaft 22 and torque from the motor 15 to an intermediate shaft 23, thereby preferably reducing the rotational speed of the intermediate shaft 23 in respect to the motor shaft 22 and enhancing the torque. Hence, the motor shaft 22 forms the input shaft and the intermediate shaft 23 the output shaft of the coaxial gear arrangement 20.

The magnetic bevel gear arrangement 21 is adapted for transmitting a rotational movement and torque from the output shaft 23 of the coaxial magnetic gear arrangement 20 to the tool shaft 18, wherein the two shafts 23, 18 rotate about two rotational axes which run in an angle α in respect to one another, 180°>α≥90°, thereby realizing an angular polisher 1. Further, the magnetic bevel gear arrangement 21 can also be adapted for reducing or enhancing the rotational speed of the tool shaft 18 in respect to the intermediate shaft 23. In that case the coaxial gear arrangement 20 could also be omitted. The intermediate shaft 23 forms the input shaft and the tool shaft 18 the output shaft of the bevel gear arrangement 21. The design of the coaxial magnetic gear arrangement 20 and the magnetic bevel gear arrangement 21 will be explained in further detail below. The gear arrangement 20 may be at least partly integrated in the electric motor 15, preferably located within the housing of the electric motor 15. Alternatively, at least part of the electric motor 15 may form part of the coaxial magnetic gear arrangement 20.

Of course, the power tool 1 according to the present invention could also be equipped with a pneumatic motor which is driven by compressed air. An example for such a pneumatic power tool 1' is shown in FIG. 2. An example for a pneumatic motor 100 is shown in FIGS. 12 to 14. A pneumatic tool 1' is especially advantageous in explosive environments, where sparks from an electric motor could provoke an explosion of an explosive mixture (e.g. oxygen and very fine dust) contained in the environment. The power tool 1' of FIG. 2 is embodied as a pneumatic random orbital polisher. An on/off-switch 6' is designed as a lever located on top of the housing 2. At a rear end of the housing 2 a pneumatic connector 13 adapted for connection to a source of compressed air is provided for driving the pneumatic motor (not shown in FIG. 2; located inside the housing 2). Furthermore, at the rear end of the housing 2 a connecting tube 14 is provided, which is adapted to be connected to the distal end of a tube of a dust suction device, for example a vacuum cleaner, for removing dust and other small particles from the working area.

An example for a pneumatic motor 100 is shown in FIG. 12 in an exploded view. The motor 100 comprises an essentially hollow cylinder-shaped body 102 for receiving a rotor 104 rotatable about a rotational axis 60 extending parallel in respect to a cylinder axis of the body 102. The rotor 104 has a plurality of longitudinal slots 106 extending essentially parallel to the rotor's rotational axis 60 and each adapted for receiving a vane 108 freely movable within the respective slot 106 in a radial direction. The hollow cylinder-shaped body 102 is closed by two end plates 110, 112.

FIG. 13 shows a cross section through the pneumatic motor 100 of FIG. 12 when mounted together. The slotted rotor 104 rotates eccentrically in a room defined by the body 102 and the two end plates 110, 112. Since the rotor 104 is off-center and its outer diameter is less than that of the cylinder-shaped body 102, a half-moon shaped room 114 remains in the inside of the hollow cylinder-shaped body 102. The vanes 108 are free to move radially in the slots 106 of the rotor 104 driven by the centrifugal force of the rotating rotor 104. When moved radially outwards the vanes 108 divide the room 114 in a number of separate partial rooms of different sizes (volumes). During rotation of the rotor 104, the centrifugal force pushes the vanes 108 radially outwards against an inner circumferential wall of the hollow cylinder-shaped body 102. Further, during rotation of the rotor 104, the size of the various partial rooms changes continuously. Compressed air 116 may enter into the room 114 or one of the partial rooms, respectively, through an ingress opening provided in the outer wall of the hollow cylinder-shaped body 102. At the end of an operation cycle air 118 may be discarded from the room 114 or from one or more of the partial rooms, respectively, through one or more egress openings 120 provided in the outer wall of the hollow cylinder-shaped body 102. In this embodiment three egress openings 120 have been provided all spaced distant to one another in a circumferential direction.

FIG. 14 shows various operating states A, B, C during operation of the pneumatic motor 100 in a cross sectional view. In state A compressed air 116 enters into a first partial room "a" through the input opening. The adjacent partial room "b" anticipating partial room "a" is defined and sealed by second and third vanes 108b, 108c. The pressure inside partial room "b" is still equal to the pressure of the inlet air 116 at the input opening. This pressure acting on the third vane 108c provokes a clockwise rotation of the rotor 104 and of the vanes 108 attached thereto (arrow 122). Then, in state B the vanes 108 have started their rotation in the cylinder body 102 and an expansion process has begun in the partial room "b". The internal pressure in partial room "b" gradually decreases but is still large enough to act on the third vane 108c in order to further rotate the rotor 104 clockwise. Further, in state C the vanes 108 have moved on an first and second vanes 108a, 108b now define and seal the first partial room "a". The pressure in partial room "b" is gradually decreasing and can no longer contribute to the rotation of the rotor 104 and, therefore, air 118 contained therein is at least partially discarded through the first egress opening 120. The force for the further rotation of the rotor 104 in the direction 122 now comes from the first room "a" and from the following partial room, which is now in pneumatic connection with the inlet opening and which is now filled with compressed air 116. As the rotation of the rotor 104 continues, further air 118 will be discarded from the partial room "b" into the environment through the following two egress openings 120. These steps A, B, C will continue for all subsequent partial rooms defined in the room 114 by the vanes 108 as the rotation of the rotor 104 continues. The rotation will stop when further supply of compressed air 116 is interrupted.

The pneumatic tool 1' is provided with at least one magnetic gear arrangement 20, 21. The gear arrangement 20 may be at least partly located within a housing of a pneumatic motor of the pneumatic power tool 1'. Alternatively, at least part of the pneumatic motor may form part of the coaxial magnetic gear arrangement 20.

Preferably, the power tool 1, 1' according to the present invention has all gear arrangements 20, 21 embodied as magnetic gear arrangements using magnetic fields to transmit the rotational movement and torque from the motor 15, 100 to the working element 9 without mechanical contact, in order to realize the working movement 11 of the working element 9.

The coaxial magnetic gear arrangement 20 and the magnetic bevel gear arrangement 21 use permanent magnets to transmit torque between an input and an output shaft. Torque densities comparable with mechanical gears can be achieved with an efficiency of 99% or better at full load and much higher efficiencies in part-load conditions than mechanical gears can achieve. Since there is no contact between the moving parts, there is no wear and no need for lubrication. Magnetic gear arrangements 20, 21 also protect against overloads by slipping harmlessly if an excessive torque is applied, and automatically and safely re-engage when the excess torque is removed. Also they have the advantage that due to the fact that driving and driven parts of the gear arrangements 20, 21 are not in contact with one another any vibrations caused by the rotating working element 9 during the intended use of the power tool 1, 1' are extenuated thereby providing for an even and smooth operation of the power tool 1 and high comfort for users.

A preferred embodiment of a coaxial magnetic gear arrangement 20 is shown in FIGS. 3 and 4. The gear arrangement 20 uses a series of ferromagnetic (e.g. steel) segments or pole-pieces 50 to modulate magnetic fields produced by two permanent magnet rotors 52, 54 with different numbers of permanent magnets 56, 58. The magnets 56, 58 are located on the rotors 52, 54 next to each other with alternating polarities in a circumferential direction. The pole pieces 50 are preferably supported by a non-magnetic and non-conductive structure 51. In this arrangement the magnet arrays of the inner and outer rotors 52, 54 rotate at different speeds, with the gear ratio determined by the ratio of magnets 56, 58 in each array. A rotational axis of the inner rotor 52 as well as of the outer rotor 54 is indicated with reference sign 60. The inner rotor 52 is preferably connected to the fast rotating input or motor shaft 22 in a torque proof manner. The outer rotor 54 is preferably connected to the output or intermediate shaft 23 in a torque proof manner. The pole-pieces 50 and the support structure 51 are static (see FIG. 4). In the embodiment of FIG. 3 the gear arrangement 20 has a gear ratio of 20:8 or 5:2, respectively. Other gear ratios of 50:1 down to 1.01:1 with almost zero torque ripple can be achieved. In the embodiment of FIGS. 3 and 4 the magnetic flux is transmitted from the inner rotor 52 to the outer rotor 54 in a radial direction.

Alternatively, it is also possible that the inner rotor 52 is connected to the motor shaft 22, the intermediate component comprising the support structure 51 and the pole pieces 50 is connected to the output or intermediate shaft 23 and the outer rotor 54 is held stationary, for example by being fixed to the housing 2 of the power tool 1 or by forming part of the housing 2.

Generally speaking, the at least one coaxial magnetic gear arrangement 20 has three principle components 50, 52, 54, all three of which may rotate relative to each other about the rotational axis 60. A radially inner rotor 52 of the three components generates a first magnetic field with a first number of pole pairs each pole pair comprising two magnets 56 of opposing polarity. A radially outer rotor 54 of the three components generates a second magnetic field with a second number of pole pairs each pole pair comprising two magnets 58 of opposing polarity. In order to provide for a gear ratio ≠1, the number of magnetic pole pairs of the two rotors 52, 54 has to be different. A radially intermediate component of the three components has a number of ferromagnetic pole pieces 50 supported by the non-magnetic and non-conductive support structure 51. The third component 50, 51 acts as a passive part of a magnetic circuit between the first component 52 and the second component 54. Preferably, in order to realize a constant gear ratio, one of the components is connected to the input shaft 22, another one of the components is connected to the output shaft 23 and the third component is maintained stationary.

There is no physical contact between any of the driving and driven parts 52, 54 as the motion is transferred across an air gap using the force of the magnetic field. The intermediate component comprising the pole pieces 50 and the ring-shaped support structure 51 is located in the air gap between the inner ring 52 and the outer ring 54 resulting in a first air gap 53a between the support structure 51 with the pole pieces 50 and the outer ring 54 and in a second air gap 53b between the support structure 51 with the pole pieces 50 and the inner ring 52. These air gaps allow the magnetic gear arrangement 20 to work without lubrication and provides for a quiet and smooth operation.

The magnetic gear arrangement 20 works as follows: By rotating the inner magnet ring 52 with the steel segments 50 not yet inserted into the air gap the magnetic field produced by these magnets 56 has an array of four north and four south poles rotating at the same speed. After introduction of the steel segment ring 50, 51 into the air gap, this field pattern is considerably altered. The outer magnetic ring 54 consists of a larger number of (in the embodiment of FIG. 3: ten)

north and south magnets 58. These would couple with the altered magnetic field generated by the inner magnets 56 and rotate at a lower speed in the opposite direction than the inner ring 52. If the outer magnet ring 54 was stationary and the intermediate ring with the ferromagnetic segments 50 was rotatable about the axis 60, it would rotate at the lower speed in the same direction as the inner ring 52.

The magnetic gear arrangement 20 may be located within a closed housing (not shown in the figures), with at least the output shaft (the intermediate shaft 23) of the magnetic gear arrangement 20, which is directly or indirectly connected to the working element 9 and which emerges from the housing through a throughway opening. Preferably, also an input shaft (the motor shaft 22) of the magnetic gear arrangement 20 enters into the housing through another throughway opening. In the case where the outer magnetic ring 54 of the magnetic gear arrangement 20 is stationary in respect to the housing 2 of the power tool 1, 1' the outer ring 54 could make an integral part of the housing of the magnetic gear arrangement 20. Preferably, the closed housing comprises at least one sealing element for sealing the throughway openings in respect to the output shaft and/or input shaft, respectively.

Another embodiment of a coaxial magnetic gear arrangement 20 is shown in FIG. 5. It comprises a first ring 52 with a first number of permanent magnets 56 disposed along its circumference with changing polarities. In this example, the first ring 52 is provided with a total of four magnets 56 (two pole pairs), two magnets 56 with positive polarity and two magnets 56 with negative polarity, the polarities alternating along the circumference of the first ring 52. Furthermore, the gear arrangement 20 of FIG. 5 comprises a second ring 54 with a second number of permanent magnets 58 disposed along its circumference with changing polarities. In this example, the second ring 54 is provided with a total of twelve magnets 58 (six pole pairs), six magnets 58 with positive polarity and six magnets 58 with negative polarity, the polarities alternating along the circumference of the second ring 54. The two rings 52, 54 are located coaxially and are rotatable independently about the same rotational axis 60, but displaced axially in respect to one another.

Surrounding the two rings 52, 54 externally are ferromagnetic segments 50 each having a longitudinal extension along the axis 60. The segments 50 may be held by a support structure 51 (not shown in FIG. 5). Preferably, the segments 50 extend along the entire length of the two rings 52, 54 in the direction of the axis 60. In this example there are eight ferromagnetic segments 50 provided along the outer circumference of the two rings 52, 54. Preferably, the segments 50 are equidistantly spaced apart from one another in a circumferential direction. In this example the magnetic gear arrangement 20 has a gear ratio of 3:1 (6 pole pairs/2 pole pairs). Air gaps are provided between the two rings 52, 54 in an axial direction as well as between the outer circumferential surface of the two rings 52, 54 and a surface of the ferromagnetic segments 50 facing radially inwards.

In this embodiment, the first ring 52 is connected to the high speed motor shaft 22 and the second ring 54 is connected to the tool shaft 18 or any intermediate shaft 23 connected to the tool shaft 18 directly or indirectly (e.g. by means of a bevel gear 21). The tool shaft 18 is directly or indirectly (e.g. by means of an eccentric element 17 or a hypocycloid gear arrangement 41 of FIG. 11) connected to the working element 9. In the embodiment of FIG. 5 the magnetic flux is transmitted from the first ring 52 to the second ring 54 in a transverse direction. More in detail, the flux is transmitted radially from the first magnetic element 52 to the ferromagnetic segments 50 and also from the ferromagnetic segments 50 to the second magnetic element 54. The external ferromagnetic segments 50 provide for a transmission of the magnetic fields of the two elements 52, 54 in a manner that they interact with one another and that the second element 54 rotates with a certain number of rotations. In this embodiment the magnetic flux is not transmitted directly between the first element 52 and the second element 54 but rather indirectly by means of the ferromagnetic elements 50.

Yet another embodiment of a coaxial magnetic gear arrangement 20 is shown in FIG. 6. This gear arrangement 20 is of the disk type. It comprises a first disk 52 with a first number of permanent magnets 56 disposed with circumferentially alternating polarities on one side of the disk 52. In this example, the first disk 52 is provided with a total of six magnets 56 (three pole pairs), three magnets 56 with positive polarity and three magnets 56 with negative polarity, the polarities alternating along the circumference of the first disk 52. Furthermore, the gear arrangement 20 of FIG. 6 comprises a second disk 54 with a second number of permanent magnets 58 disposed with circumferentially alternating polarities on one side of the disk 54. In this example, the second disk 54 is provided with a total of sixteen magnets 58 (eight pole pairs), eight magnets 58 with positive polarity and eight magnets 58 with negative polarity, the polarities alternating along the circumference of the second disk 54. The magnets 56, 58 have a radial extension. The two disks 52, 54 are located coaxially, and are rotatable independently about the same rotational axis 60, the surfaces of the two disks 52, 54 carrying the permanent magnets 56, 58 facing each other.

The two disks 52, 54 are spaced apart from one another in an axial direction leaving an air gap between the two surfaces of the disks 52, 54 facing each other. In this air gap an intermediate disk 51 with ferromagnetic segments 50 each having a radial extension is located. The intermediate disk 51 serves as a support structure for the ferromagnetic segments 50. Air gaps are provided between the facing surfaces of the two disks 52, 54 and the intermediate disk 51, respectively. In this example there are twelve ferromagnetic segments 50 provided between the two disks 52, 54.

Preferably, the segments 50 are equidistantly spaced apart from one another in a circumferential direction. In this example the magnetic gear arrangement 20 has a gear ratio of 2.67:1 (8 pole pairs/3 pole pairs).

In this embodiment, the first disk 52 is connected to the high speed motor shaft 22 and the second disk 54 is connected to the tool shaft 18 or any intermediate shaft 23 connected to the tool shaft 18 directly or indirectly (e.g. by means of a bevel gear 21). The tool shaft 18 is directly or indirectly (e.g. by means of an eccentric element 17 or a hypocycloid gear arrangement 41 of FIG. 11) connected to the working element 9. In the embodiment of FIG. 6 the magnetic flux is transmitted from the first disk 52 to the second disk 54 in an axial direction.

FIG. 9 shows a preferred embodiment of the magnetic bevel gear arrangement 21. The magnetic bevel gear arrangement 21 is adapted for transmitting a rotational movement and torque from the intermediate shaft 23 (input shaft) to the tool shaft 18 (output shaft), wherein the two shafts 23, 18 rotate about two axes 72, 10 which run at an angle $\alpha$ in respect to one another, $180°>\alpha\geq90°$. Two bevel gear wheels 64, 66 have a certain number of permanent magnets 68, 70 provided thereon with alternating polarities located one next to the other. In this embodiment the two bevel gear wheels 64, 66 have the same diameter and the same number of permanent magnets 68, 70 resulting in a gear ration of 1:1. Further, the magnetic bevel gear arrangement 21 can also be adapted for reducing or enhancing the rotational speed of the tool shaft 18 in respect to the intermediate shaft 23. This can be achieved, for example by choosing two bevel gear wheels 64, 66 of different diameters and/or having a different number of permanent magnets 68, 70 provided thereon. Also the magnetic bevel gear arrangement 21 uses magnetic fields to transmit the rotational movement and torque from the motor 15 or the intermediate axis 23, respectively, to the tool shaft 18 or the working element 9, respectively, without mechanical contact, in order to realize the rotational working movement.

A further embodiment of a coaxial magnetic gear arrangement 20 is shown in FIG. 8. In that embodiment, the magnetic gear arrangement 20 is designed as a magnetic planetary gear arrangement. The various gear wheels (sun gear wheel 80, planetary gear wheels 82, outer gear ring 84) are provided with a certain number of permanent magnets 86 located one next to the other with alternating polarities. Again, the gear ratio is defined by the diameters of the gear wheels 80, 82, 84 and/or by the ratio of the number of magnets 86 provided on the different gear wheels 80, 82, 84. The sun gear wheel 80 can be connected to the input shaft 22 and the gear ring 84 can be connected to the output shaft 23 (not shown in FIG. 8).

Furthermore, if the working element 9 of the power tool 1 performed a roto-orbital (gear driven) working movement, an additional gear arrangement (not shown) would be provided between the tool shaft 18 and the rotational shaft 19 of the working element 9 provoking a forced rotational movement of the working element 9 about the second rotational axis 16 depending on and in close relationship to the rotational movement of the working element 9 about the first rotational axis 10. For example, for each rotation of the working element 9 about the first axis 10, the working element 9 can be forced by the additional gear arrangement to perform twenty rotations about the second axis 16. Such an additional gear arrangement could be realized as a magnetic hypocycloid gear arrangement 41, like the one shown in FIG. 11.

The embodiment of FIG. 11 comprises an outer annular static part 30 with a first number of permanent magnets 32 fixed to an inner circumference or on the bottom surface at a given diameter of the annular part 30. In the power tool 1 of FIGS. 1, 2 and 10, the annular part 30 would be connected to the housing 2 of the tool 1, 1'. Further, the hypocycloid gear arrangement 41 comprises a first circular rotating part 34, which is held and rotatably guided in respect to the annular part 30 about a first rotational axis indicated with 36 and corresponding to the first rotational axis 10. In the power tool 1, 1' the first rotating part 34 would be connected to the tool shaft 18 in a torque proof manner. The axis 36 also forms the center of the circularly disposed magnets 32. A second circular rotating part 38 is provided, which is held and rotatably guided in respect to the first rotating part 34 about a second rotational axis indicated with 40 and corresponding to the second rotational axis 16. The outer circumference or the top surface of the second rotating part 38 is provided with a second number of permanent magnets 42 facing the permanent magnets 32 of the static part 30. The second rotating part 38 would be connected to the working element 9 of the tool 1, 1' in a torque proof manner. The magnetic fields of the first and second magnets 32, 42 interact with one another in order to achieve the gearing functionality and to realize the roto-orbital movement of the working element 9.

If the first rotating part 34 is rotated in the direction of arrow 44, the second rotating part 38 is forced into a rotation in the opposite direction indicated with arrow 46. A counterweight 48 may be attached to or designed on the first rotating part 34 opposite to the second rotating part 38 (or the rotational axis 40, respectively) in respect to the rotational axis 36. The counterweight 48 compensates for the weight of the second rotating part 38 and of the working element 9 attached thereto, and provides for a quiet and smooth (vibration free) rotation of the working element 9 during its roto-orbital movement.

The hypocycloid gear arrangement 41 of FIG. 11 can be arranged in the power tool 1, 1' of FIG. 10, e.g. instead of the eccentric element 17. In particular, the outer annular static part 30 is attached or fixed to the housing 2 of the power tool 1, 1' such that the rotational axis 36 of the first circular rotating part 34 is aligned with the rotational axis 10 of the tool shaft 18. The tool shaft 18 is fixed to the first rotating part 34 in a torque proof manner. The working element 9 is fixed to the second circular rotating part 38 in a torque proof manner, wherein the rotational axis 40 of the second rotating part 34 corresponds to the second rotational axis 16 of the working element 9. By activating the power tool 1, 1', the working element 9 performs the roto-orbital (gear driven) working movement 11.

In the embodiment of FIG. 11, the diameter of the first rotating part 34 is twice the diameter of the second rotating part 38. The first number of permanent magnets 32 on the first rotating part 30 is twice the number of the second number of permanent magnets 42 on the second rotating part 38. This hypocycloid gear arrangement 41 has a gear ratio of 1:2, which means that for each one rotation of the first rotating part 34 about the axis 36, the second rotating part 38 is forced to carry out two rotations about the axis 40. Of course, other gear ratios could easily be realized by applying rotating parts 34, 38 with different diameters and/or with different numbers of permanent magnets 32, 42.

FIG. 7 shows another embodiment of the present invention, where at least part of the electric motor 15 is integrated in a coaxial magnetic gear arrangement 20. With this evolution of the magnetic gear arrangement 20, a stator 90 is introduced with electrical windings 92 around the gear arrangement 20. Preferably, the stator 90 is fixed to or makes part of the stationary outer ring 54 of the magnetic gear arrangement 20. In the present embodiment the stator 90 comprises six windings 92 disposed tangentially around the outer circumference of the magnetic gear arrangement 20. Of course, a different number of windings 92 could be provided, too. This generates a very compact electric motor 15 that is particularly powerful. The resulting electrical machine 20' is particularly well suited for applications in connection with a hand guided and/or hand held power tool 1, where a high speed electric motor 15 is traditionally used with a mechanical gear arrangement for reducing the speed and enhancing the torque.

The electrical machine 20' (comprising the integrated electric motor 15 and magnetic gear arrangement 20) works as follows: With the permanent magnets 58 of the outer magnet ring 54 and the ferromagnetic (e.g. steel) segments 50 of the intermediate ring 51 being removed, the inner magnet ring 52 with its magnets 56 is left within a set of windings 92 housed in the stator 90. This would be identical to a conventional permanent magnet motor 15 but with a large air gap between the magnets 56 of the rotor and the stator 90. As an electric current flows in the windings 92, the inner magnet ring 52 will rotate. If the steel segment rotor 51 is introduced into the air gap between the inner magnet ring 52 and the stator windings 92 this has no adverse effect in the operation of the motor 15. By fixing the outer magnet ring 54 to the stator 90 the steel segment ring 51 now rotates at a slower speed than the inner magnet ring 52. Just like with a conventional magnetic gear arrangement 20 the steel segment ring 51 drives the output shaft 23 directly or indirectly connected to the working element 9. This combined electrical machine 20' has no motor shaft 22 due to the integration of the electric motor 15 in the magnetic gear arrangement 20. The machine 20' has all the benefits of a magnetic gear arrangement 20 like high efficiency, low maintenance, and high reliability. The result is a very compact high torque electrical machine 20' very well suited for use in any type of electric power tool 1 having a working element 9 performing a working movement 11.

It is possible that the combined machine 20' comprising at least part of the electric motor 15 and the magnetic gear arrangement 20 is located within a single closed housing. Usually, in that case there would be no input or motor shaft 22 from the electric motor 15 entering the housing through a throughway opening because the electric motor 15 would be integrated within the housing. There would only be the output shaft 23 emerging from the housing through a throughway opening.

In the embodiment of FIG. 7 the outer component 54 of the magnetic gear arrangement 20 or the stator 90 of the electric motor 15, respectively, together with end plates for closing the front and back openings of the hollow cylinder-shaped outer component 54 or stator 90, respectively, form a closed housing in which all components of the entire electrical machine 20' are located. The closed housing is particularly interesting for power tools 1 because it prevents dust and humidity from entering into the machine 20', where they could have a negative impact on the free movement of the rotating parts (e.g. 50, 51, 52, 56) of the magnetic gear arrangement 20 and of the electric motor 15.

Of course, the above explanations made in connection with the integration of the electric motor 15 in the magnetic gear arrangement 20 would apply, mutatis mutandis, also for a pneumatic motor.

FIG. 15 shows a longitudinal sectional view through a combined pneumatic motor 100 and magnetic gear arrangement 20 according to a first embodiment of the invention (combined pneumatic machine 20"). The motor 100 and the gear arrangement 20 are located next to each other displaced in an axial direction along the rotational axis 60. In order to integrate the magnetic gear arrangement 20 into the pneumatic motor 100, it is possible, to extend the length of the hollow cylinder-shaped housing 102 in the axial direction. The extended portion of the housing 102 forms the stationary outer component 54 of the magnetic gear arrangement 20. The permanent magnets 58 could be attached to the inner circumferential wall of the extended portion of the hollow cylinder-shaped housing 102. The motor shaft 22 could be connected to the inner component 52 of the magnetic gear arrangement 20 in a torque proof manner. Alternatively, the motor shaft 22 could simply be extended and the permanent magnets 56 attached thereto, the extended portion of the motor shaft 22 with the magnets 56 then forming the inner component 52 of the magnetic gear arrangement 20. The intermediate component 51 with the ferromagnetic segments 50 would then be connected to an output shaft 23 of the gear arrangement 20.

In the embodiment of FIG. 15 the housing 102 and the extended part of the housing 102 forming the outer component 54 of the magnetic gear arrangement 20 together with end plates 110, 112 form a closed housing of the pneumatic machine 20" in which the combined pneumatic motor 100 and magnetic gear arrangement 20 is located. The closed housing is particularly interesting for power tools 1' because it prevents dust and humidity from entering into the magnetic gear arrangement 20, where they could have a negative impact on the free movement of the rotating parts (e.g. 50, 51, 52, 56) of the magnetic gear arrangement 20.

The end plate 110 may comprise a throughway opening 124, which may be provided with bearing and/or sealing means 126. The output shaft 23 would extend through the throughway opening 124 and be guided by the bearing and/or sealed in respect to the end plate 110 surrounding the throughway opening 124. From there, the output shaft 23 could either be directly connected to the working element 9 or, alternatively, be indirectly connected thereto by means of a magnetic bevel gear 21 and/or any other type of magnetic or mechanical gear arrangement, e.g. the hypocycloid gear arrangement 41 shown in FIG. 11, to the working element 9.

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. A hand held electric or pneumatic power tool in the form of a sander or a polisher, comprising an electric or pneumatic motor, a working element in the form of a backing pad, realizing a roto-orbital or a random orbital working movement, when the electric or pneumatic motor is activated, and at least one coaxial magnetic gear arrangement functionally located between the electric or pneumatic motor and the working element for transmitting a rotational movement and torque from the electric or pneumatic motor to the working element in order to realize the working movement, wherein the at least one coaxial magnetic gear arrangement has three principle coaxial components, all three of which may rotate relative to each other about a common rotational axis, the three principle coaxial components having a first component with a first number of permanent magnets arranged in magnetic pole pairs that generates a first magnetic field, a second component with a second number of permanent magnets arranged in magnetic pole pairs that generates a second magnetic field, and a radially intermediate third component with a non-magnetic structure carrying a third number of ferromagnetic pole pieces that acts as a passive part of a magnetic circuit between the first component and the second component.

2. The power tool of claim 1, wherein the first number of pole pairs of the first component is smaller than the second number of pole pairs of the second component.

3. The power tool of claim 2, wherein the first component is an inner component connected to a shaft of the electric or pneumatic motor.

4. The power tool of claim 1, wherein the electric or pneumatic motor is an electric motor comprising a stator with electrical windings and a rotor with magnetic pole pairs, wherein the first component of the at least one magnetic gear arrangement is formed by the rotor of the electric motor, and wherein the magnetic pole pairs of the rotor of the electric motor also act as the magnetic pole pairs of the first component of the at least one magnetic gear arrangement.

5. The power tool of claim 4, wherein the second component or the radially intermediate third component of the at least one magnetic gear arrangement is connected to the stator of the electric motor in a torque proof manner.

6. The power tool of claim 5, wherein the third component or the second component of the at least one magnetic gear arrangement, which is not connected to the stator of the electric motor, is connected to a tool shaft of the power tool, which is directly or indirectly connected to the working element, or to an intermediate shaft of the power tool, which is directly or indirectly connected to the tool shaft.

7. The power tool of claim 2, wherein the electric or pneumatic motor is an electric motor comprising a stator with electrical windings and a rotor with magnetic pole pairs, wherein the first component of the at least one magnetic gear arrangement is formed by the rotor of the electric motor, and wherein the magnetic pole pairs of the rotor of the electric motor also act as the magnetic pole pairs of the first component of the magnetic gear arrangement.

8. The power tool of claim 2, wherein the electric or pneumatic motor is an electric motor; and the second component of the at least one magnetic gear arrangement is located radially outside the radially intermediate third component of the at least one magnetic gear arrangement and is provided with electrical windings located radially outside of the magnetic pole pairs, in order to form or make part of an outer stator of the electric motor, wherein the first component of the at least one magnetic gear arrangement is located radially inside the radially intermediate third component and forms or makes part of an inner rotor of the electric motor and wherein the outer second component and the third intermediate component are located between the windings and the inner first component.

9. The power tool of claim 2, wherein the electric or pneumatic motor is an electric motor; and the first component of the at least one magnetic gear arrangement is located radially outside the radially intermediate third component of the at least one magnetic gear arrangement and forms or makes part of an outer rotor of the electric motor, wherein the second component of the magnetic gear arrangement is located radially inside the radially intermediate third component of the at least one magnetic gear arrangement and wherein the inner first component or the third intermediate component is provided with electrical windings in order to form or make part of an inner stator of the electric motor.

10. The power tool of claim 2, wherein the first component comprises a first number (n_input) of permanent magnets, the second component comprises a second number (n_output) of permanent magnets, wherein the first number (n_input) of permanent magnets and the second number (n_output) of permanent magnets are even numbers, and wherein the gear ratio (i) of the at least one magnetic gear arrangement is i=n_output/n_input.

11. The power tool of claim 1, wherein the electric or pneumatic motor is an electric motor; and the second component of the magnetic gear arrangement is located radially outside the radially intermediate third component of the magnetic gear arrangement and is provided with electrical windings located radially outside of the magnetic pole pairs, in order to form or make part of an outer stator of the electric motor, wherein the first component of the magnetic gear arrangement is located radially inside the radially intermediate third component and forms or makes part of an inner rotor of the electric motor and wherein the outer second component and the third intermediate component are located between the windings and the inner first component.

12. The power tool of claim 1, wherein the electric or pneumatic motor is an electric motor; and the first component of the at least one magnetic gear arrangement is located radially outside the radially intermediate third component of the magnetic gear arrangement and forms or makes part of an outer rotor of the electric motor, wherein the second component of the at least one magnetic gear arrangement is located radially inside the radially intermediate third component of the at least one magnetic gear arrangement and wherein the inner first component or the third intermediate component is provided with electrical windings in order to form or make part of an inner stator of the electric motor.

13. The power tool of claim 1, wherein the at least one magnetic gear arrangement is located within a closed housing, with at least an output shaft of the at least one magnetic gear arrangement, which is connected in a torque proof manner to the working element, emerging from the housing through a throughway opening.

14. The power tool of claim 1, wherein the first component comprises a first number (n_input) of permanent magnets, the second component comprises a second number (n_output) of permanent magnets, wherein the first number (n_input) of permanent magnets and the second number (n_output) of permanent magnets are even numbers, and wherein the gear ratio (i) of the at least one magnetic gear arrangement is i=n_output/n_input.

15. The power tool of claim 1, wherein the radially intermediate third component comprises a third number (n_pp) of ferromagnetic pole pieces, which is either n_pp=(n_output−n_input) or n_pp=(n_output+n_input).

16. The power tool of claim 1, wherein the non-magnetic structure comprises a non-magnetic and non-conductive structure.

* * * * *